United States Patent
Froese et al.

(10) Patent No.: US 12,186,732 B2
(45) Date of Patent: Jan. 7, 2025

(54) OIL REMEDIATION COMPOSITION, PROCESS FOR PRODUCING SAID OIL REMEDIATION COMPOSITION, AND PROCESS FOR REMEDIATING OIL SPILLS

(71) Applicant: SWM LUXEMBOURG, Contern (LU)

(72) Inventors: Hank Froese, Winkler (CA); Joaquin Mota, Winkler (CA); Brian K. Cooley, Alpharetta, GA (US)

(73) Assignee: SWM Holdings US, LLC, Atlanta, GA (US)

( * ) Notice: Subject to any disclaimer, the term of this patent is extended or adjusted under 35 U.S.C. 154(b) by 812 days.

(21) Appl. No.: 17/292,352

(22) PCT Filed: Nov. 8, 2019

(86) PCT No.: PCT/US2019/060415
§ 371 (c)(1),
(2) Date: May 7, 2021

(87) PCT Pub. No.: WO2020/097430
PCT Pub. Date: May 14, 2020

(65) Prior Publication Data
US 2022/0001356 A1 Jan. 6, 2022

Related U.S. Application Data

(60) Provisional application No. 62/821,100, filed on Mar. 20, 2019, provisional application No. 62/757,404, filed on Nov. 8, 2018.

(51) Int. Cl.
*B01J 20/24* (2006.01)
*B01J 20/28* (2006.01)
(Continued)

(52) U.S. Cl.
CPC ......... *B01J 20/24* (2013.01); *B01J 20/28004* (2013.01); *B01J 20/28011* (2013.01);
(Continued)

(58) Field of Classification Search
None
See application file for complete search history.

(56) References Cited

U.S. PATENT DOCUMENTS 2,588,152 A  3/1952 Newman
3,094,323 A  6/1963 Catania
(Continued)

FOREIGN PATENT DOCUMENTS

DE  60107122 T2 * 1/2006 ......... B01D 17/0202
EP  655491 A1 * 5/1995 ........... A01K 1/0155
(Continued)

OTHER PUBLICATIONS

Chinese Office Action Corresponding to Application No. 201980073545.6 on Nov. 29, 2023.
(Continued)

*Primary Examiner* — Daniel Berns
(74) *Attorney, Agent, or Firm* — Dority & Manning, P.A.

(57) ABSTRACT

A remedial composition is disclosed made from plant material residue that has been densified and then reduced into discrete pieces with a bulk density of from about 0.2 g/cm$^3$ to about 0.5 g/cm$^3$. The composition can be made from various different plant species and can be particularly made from agricultural crop byproducts, such as flax shives. The composition is particularly well suited for use as a remediation product for cleaning up and/or removing oily substances, such as petroleum products.

10 Claims, 4 Drawing Sheets

(51) Int. Cl.
*B01J 20/30* (2006.01)
*C09K 3/32* (2006.01)

(52) U.S. Cl.
CPC ..... *B01J 20/28016* (2013.01); *B01J 20/3007* (2013.01); *B01J 20/3021* (2013.01); *C09K 3/32* (2013.01); *B01J 2220/4825* (2013.01); *B01J 2220/485* (2013.01)

(56) References Cited

U.S. PATENT DOCUMENTS

| | | | |
|---|---|---|---|
| 3,928,049 A | 12/1975 | Otouma et al. | |
| 4,071,165 A | 1/1978 | Leopoldi | |
| 4,269,315 A | 5/1981 | Boyce | |
| 5,062,954 A | 11/1991 | Leedy et al. | |
| 5,116,595 A | 5/1992 | Scribner et al. | |
| 6,612,258 B2 | 9/2003 | Isman et al. | |
| 7,544,635 B2 | 6/2009 | Liang | |
| 7,661,555 B1 | 2/2010 | Evans et al. | |
| 9,381,068 B2 | 7/2016 | Konishi | |
| 9,414,721 B2 | 8/2016 | Marin-Quintero et al. | |
| 2004/0099677 A1 | 5/2004 | Harris et al. | |
| 2008/0256851 A1 | 10/2008 | Lumb | |
| 2009/0302048 A1 | 12/2009 | Nobilet et al. | |
| 2012/0052298 A1 | 3/2012 | Hagen et al. | |
| 2015/0191299 A1 | 7/2015 | Tsuei | |
| 2020/0115143 A1 | 4/2020 | Rutan et al. | |

FOREIGN PATENT DOCUMENTS

| | | |
|---|---|---|
| JP | S4880491 A | 10/1973 |
| JP | H08-131824 | 5/1996 |

OTHER PUBLICATIONS

Su et al., Civil Engineering Materials, Wuhan University of Technology Press, pp. 9-10, Jun. 30, 2009.

Wan et al., Testing and Research on Phases and Properties of Non-metallic Mineral Products, Wuhan University of Technology Press, pp. 163, Feb. 28, 1992.

Japanese Office Action Corresponding to Application No. 2021-524340 on Oct. 23, 2023.

* cited by examiner

OIL REMEDIATION COMPOSITION, PROCESS FOR PRODUCING SAID OIL REMEDIATION COMPOSITION, AND PROCESS FOR REMEDIATING OIL SPILLS

RELATED APPLICATIONS

This application is the U.S. National Stage entry of International Application Number PCT/US2019/060415 filed under the Patent Cooperation Treaty and having a filing date of Nov. 8, 2019, and which claims priority to U.S. Provisional Patent Application Ser. No. 62/821,100, filed on Mar. 20, 2019, and U.S. Provisional Patent Application Ser. No. 62/757,404, filed on Nov. 8, 2018, all of which are incorporated herein by reference in their entirety.

BACKGROUND

Large quantities of plant material residue are produced each year as byproducts of agricultural processes and/or industrial processes. For example, in one embodiment, the plant material residue may comprise byproducts of agricultural crops. Plant material residue produced in large quantities each year include, for instance, flax shives, corn stovers, wheat straw, barley straw, switch grass, bagasse, and the like.

For example, flax straw is grown as a commercial crop for extracting fibers from the plant. The flax fiber can be used in numerous and diverse applications. When flax fibers are extracted from flax straw, the remaining non-fibrous plant material residue is referred to as flax shives. Shives can comprise between 20% and 85% of the total flax straw weight. Thus, shives are a major byproduct of flax straw processing. In the past, flax shives have been used in order to produce animal bedding or burnt as a fuel, or disposed of by land application or disposition in a sanitary landfill.

A need exists, however, for further uses and applications for plant material byproducts, such as flax shives.

SUMMARY

In general, the present disclosure is directed to producing new and useful products from plant material residue, and particularly from agricultural crop byproducts. In accordance with the present disclosure, plant material residue is densified and then broken up into discrete pieces. The resulting composition has been found to have a unique blend of physical properties. For instance, the product has been found to be well suited to adsorbing and/or absorbing oily substances for use in cleaning up oil spills.

For example, in one embodiment, the present disclosure is directed to a process for remediating oil spills. The process includes contacting an oily substance with an oil adsorbent composition. The oil adsorbent composition, for instance, comprises pieces of densified plant material residue. The plant material residue can include non-fibrous plant matter. In accordance with the present disclosure, the pieces of densified plant material residue have a bulk density of from about 0.2 g/cm$^3$ to about 0.5 g/cm$^3$, such as from about 0.25 g/cm$^3$ to about 0.4 g/cm$^3$.

The pieces of densified plant material residue can contain various different plant matter. For instance, the densified plant material residue can comprise flax shives, corn stovers, hemp herd, bagasse, wheat straw, barley straw, switch grass, and the like. In one embodiment, the oil adsorbent composition contains the densified plant material residue in an amount greater than about 70% by weight, such as in an amount greater than about 80% by weight, such as in an amount greater than about 90% by weight, such as in an amount greater than about 95% by weight.

The oil adsorbent composition can be used to remediate all different types of oily substances. For instance, in one embodiment, the oil adsorbent composition can be used to clean up petroleum-based products or substances derived from petroleum. In addition, the oil adsorbent composition can be used to adsorb all different types of liquid hydrocarbons. The oil adsorbent composition possesses excellent oil adsorbent properties. For instance, the oil adsorbent composition can display a D5 mean oil adsorbency based on volume (cm$^3$/cm$^3$) of greater than about 0.7, such as from about 0.75 to about 1.00 when tested according to ASTM Test F726-17.

The present disclosure is also directed to an oil remediation composition that comprises pieces of densified plant material residue. The plant material residue can comprise, for instance, flax shives, corn stovers, hemp herd, bagasse, wheat straw, barley straw, switch grass, and the like. The pieces of densified plant material can generally have a density of from about 0.7 g/cm$^3$ to about 1 g/cm$^3$, such as from about 0.75 g/cm$^3$ to about 0.95 g/cm$^3$. The pieces of densified plant material residue can have a bulk density of from about 0.2 g/cm$^3$ to about 0.5 g/cm$^3$, such as from about 0.25 g/cm$^3$ to about 0.4 g/cm$^3$.

In one embodiment, the oil remediation composition is made from flax shives. For instance, the composition can comprise greater than about 70% by weight, such as greater than about 80% by weight, such as greater than about 90% by weight flax shives.

The present disclosure is also directed to a process for producing an oil remediation composition as described above. The process includes densifying plant material residue into briquettes. The plant material residue, for instance, can be subjected to a pressure sufficient to produce a briquette having a density of greater than about 0.6 g/cm$^3$, such as from about 0.7 g/cm$^3$ to about 1 g/cm$^3$. The pressure, for instance, can be greater than about 2500 psi, such as greater than about 3000 psi, such as greater than about 3500 psi, and generally less than about 50,000 psi. In accordance with the present disclosure, the briquettes are then reduced into discrete pieces. The size of the discrete pieces can be such that greater than 50% of the pieces can have a largest dimension of from about 0.5 inches to about 5 inches, such as from about 0.5 inches to about 3 inches.

The briquettes can be reduced into discrete pieces using various methods and techniques. In one embodiment, for instance, the briquettes can be fed through a nip formed between two rotating rollers. The two rotating rollers can be spaced apart to form a gap through which the briquettes are fed. The gap can have a distance of from about 0.5 inches to about 2 inches. In an alternative embodiment, however, the discrete pieces are formed from the briquettes by feeding the briquettes through a roller mill or a hammer mill.

The broken up discrete pieces or crumbles offer various advantages and benefits. The crumbles, for instance, do not create any significant amounts of nuisance dust and are lighter than many other oil or chemical remediation products. The crumbles of the present disclosure were found unexpectedly to be resistant to ignition, especially in comparison to the plant material residue prior to being densified. By being resistant to ignition, by not creating nuisance dust, and being lighter than other products, the plant material crumbles of the present disclosure increase worker safety. Once the discrete pieces or crumbles have been used to clean up an oil or chemical spill, the crumbles can be incinerated instead of being placed in a landfill.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
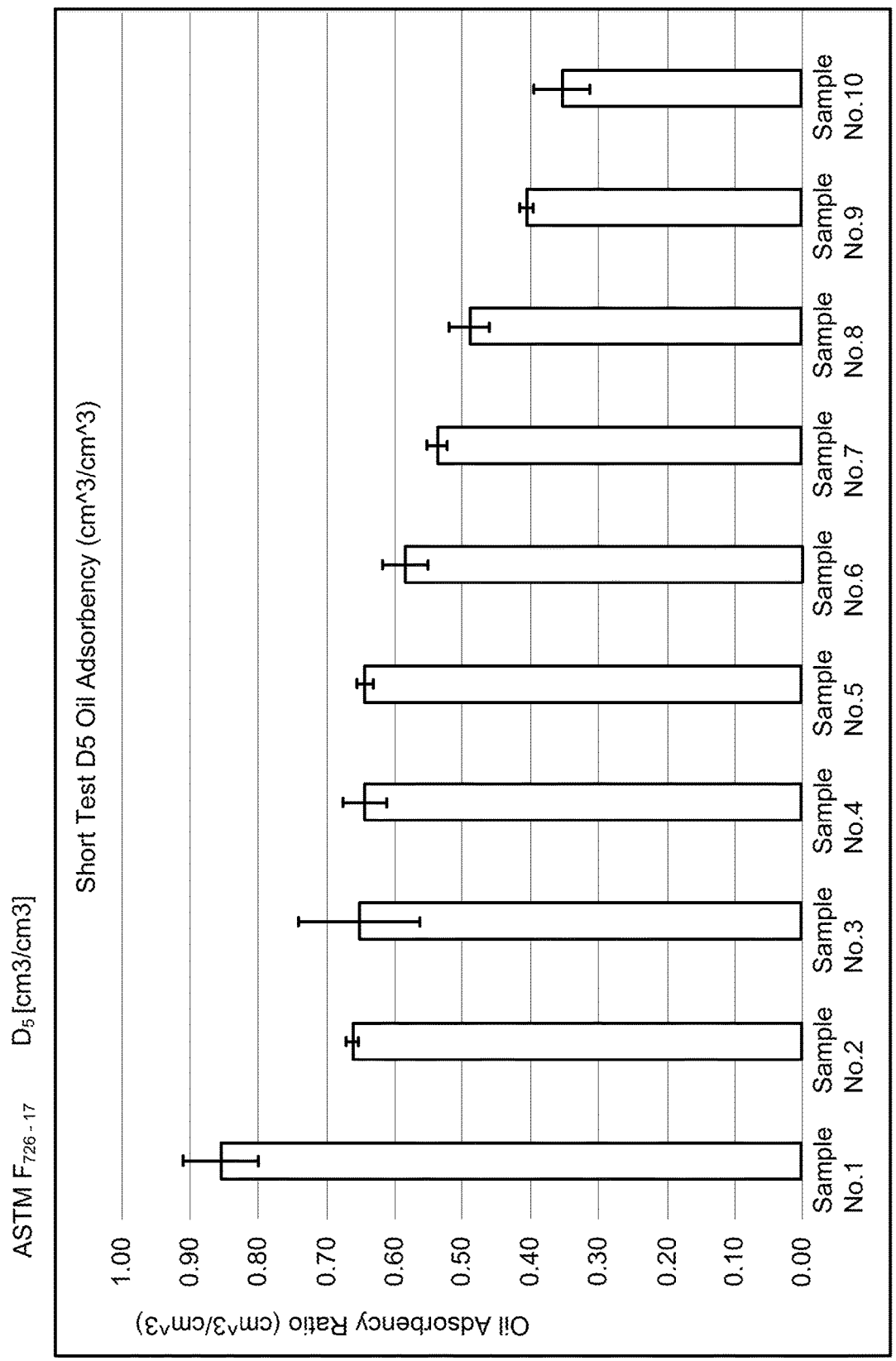
FIGS. 1-4 are graphical representations of the results obtained in the example below.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a spill remediation composition made from a plant material residue. The spill remediation composition, for instance, can be made from agricultural crop byproducts. In accordance with the present disclosure, the plant material residue is densified and then broken up into discrete pieces. Through this process, the adsorbency and absorbency characteristics of the plant material residue are dramatically and unexpectedly improved on a volume basis. Although all different types of liquid substances can be absorbed or adsorbed by the composition, the composition of the present disclosure is particularly well suited to adsorbing oily substances, such as petroleum-based materials or hydrocarbon liquids. For example, through the process of the present disclosure, the oil adsorbency properties of the plant material residue can be increased by greater than 100%, such as greater than 150% on a volumetric basis.

In addition to having excellent oil adsorbency properties, the plant material residue of the present disclosure was also found to unexpectedly be resistant to ignition. This inherent property was found to be surprising in that unprocessed plant material residue is typically used as a fuel component. By being resistant to ignition, the plant material residue of the present disclosure is very safe to store at industrial sites, which provides major benefits at locations where flammable materials are typically found, such as oils and other chemicals. In addition to being resistant to ignition, the plant material residue creates little to no nuisance dust further contributing to worker safety.

Various different plant material residues may be incorporated into the composition of the present disclosure. In one particular embodiment, for instance, the composition contains flax shives. Flax shives are the byproduct that is left over from the extraction of the fiber component from the flax straw. Shives include all materials that remain after fiber extraction.

In addition to flax shives, the plant material residue that may be incorporated into the composition of the present disclosure can include corn stovers, hemp herd, bagasse, wheat straw, barley straw, switch grass, and mixtures thereof. Corn stovers generally refer to the residue or byproduct left over after combine harvesting. Corn stovers can include corn cobs, leaf matter, stalks, and the like.

Hemp herd is similar to flax shives and is the byproduct left over after fiber extraction from hemp. Bagasse, on the other hand, refers to plant matter residue or the byproduct left over from the sugar extraction of sugar cane plants. Wheat straw, barley straw, and switch grass also refer to any part of the identified plant including byproducts of agricultural crops.

In general, in order to prepare a remediation composition in accordance with the present disclosure, the plant material residue is first densified. For example, the plant material residue can be subjected to high pressure sufficient to form a briquette. After the plant material residue is densified, the densified material is then reduced into discrete pieces. For instance, in one embodiment, a briquette made from densified plant material residue can be fed to a crumbling device that reduces the briquette into pieces having a size that improves the ability of the material to absorb and/or adsorb liquids, such as oily substances, while also having a size that facilitates handling and transportation.

In order to densify the plant material residue, any suitable compaction device may be used. In one embodiment, for instance, a briquetting press may be used. For example, in one embodiment, the plant material residue, such as flax shives, can be fed to a compression chamber contained within a briquetting press. While in the compression chamber, the material is pressed into a briquette using, for instance, a piston or plunger. After being compressed, the densified plant material residue can be fed through a die and cooled.

The amount of pressure applied to the plant material residue during the densification process can vary depending upon the particular plant matter and the desired result. In general, the amount of pressure applied to the plant material residue is greater than about 2,000 psi, such as greater than about 2,500 psi, such as greater than about 3,000 psi, such as greater than about 3,500 psi, such as greater than about 4,000 psi. In other embodiments, the pressure applied to the plant material residue can be greater than about 10,000 psi, such as greater than about 15,000 psi, such as greater than about 20,000 psi, such as greater than about 25,000 psi. The amount of pressure applied to the plant material residue is generally less than about 75,000 psi, such as less than about 50,000 psi, such as less than about 40,000 psi. This amount of pressure applied to the plant material residue can cause cellular degradation and the release of cellular matter.

In one embodiment, the temperature of the plant material residue is increased due to mechanical friction during densification. For example, the temperature within the compression chamber can be greater than about 50° C., such as greater than about 60° C., such as greater than about 70° C., such as greater than about 80° C., such as greater than about 90° C., such as greater than about 100° C., and generally less than about 130° C. In one embodiment, for instance, the temperature within the compression chamber can be from about 105° C. to about 115° C. These temperatures cause humidity in the plant material residue to vaporize. In general, the plant material residue fed to the process should have sufficient water to facilitate the densification process in forming the briquette but should not be too high so as to form adverse amounts of steam. In general, the water content of the plant material residue should be greater than about 6% by weight, such as greater than about 10% by weight, such as greater than about 12% by weight, and generally less than about 20% by weight, such as less than about 15% by weight.

The dimensions of the resulting briquette after densification is generally not critical. Thus, briquettes of any dimension can be formed in accordance with the present disclosure. In one embodiment, the briquette can have a cylindrical shape after exiting the die. For exemplary purposes only, cylindrical briquettes can be made in accordance with the present disclosure having a diameter of generally greater than about 40 mm, such as greater than about 50 mm, such as greater than about 60 mm, such as greater than about 70 mm, and generally less than about 110 mm, such as less than about 100 mm, such as less than about 90 mm, such as less than about 80 mm.

The density of the plant material residue is increased an amount sufficient to improve the adsorption properties of the material. The resulting density of the densified plant material residue, for instance, can generally be greater than about 0.6 g/cm$^3$, such as greater than about 0.7 g/cm$^3$, such as greater than about 0.75 g/cm$^3$, such as greater than about 0.8 g/cm$^3$, such as greater than about 0.85 g/cm$^3$. The density of the densified plant material residue is generally less than 1 g/cm$^3$, such as less than about 0.95 g/cm$^3$.

The initial density of the plant material residue can be generally about 0.1 g/cm$^3$. Thus, during densification, the density of the plant material residue is increased by greater than about 6 times, such as greater than about 7 times, such as greater than about 8 times.

In accordance with the present disclosure, once the plant material residue is densified, the densified matter is then broken up or crumbled into pieces. The resulting pieces can have a size sufficient to increase surface area for the adsorption or absorption of substances without creating significant amounts of fines. In general, the pieces should have a size that allows the material to be easily handled. For example, in one embodiment, greater than 50% of the pieces of densified plant matter residue have a greatest dimension of greater than about 0.25 inches, such as greater than about 0.5 inches, such as greater than about 0.75 inches, such as greater than about 1 inch, such as greater than about 1.25 inches, such as greater than about 1.5 inches, such as greater than about 1.75 inches, such as greater than about 2 inches, such as greater than about 2.25 inches, such as greater than about 2.5 inches, such as greater than about 2.75 inches, such as greater than about 3 inches, such as greater than about 3.25 inches, such as greater than about 3.5 inches, such as greater than about 3.75 inches, such as greater than about 4 inches. Greater than 50% of the pieces generally have a greatest dimension of less than about 20 inches, such as less than about 10 inches, such as less than about 8 inches, such as less than about 4 inches. Particle size can be determined using ASTM Standard Test Sieves. Standard Test Sieves, for instance, are commercially available from numerous sources, such as Custom Advanced Connections of Webster, Texas. Unless otherwise indicated, the above dimensions of greater than 50% of the pieces is based on the total weight of the sample. In other embodiments, however, the particle size and particle size distribution can be based upon volume. In one embodiment, the pieces of densified plant matter residue have an average greatest dimension of from about 0.25 inches to about 20 inches, such as from about 0.5 inches to about 15 inches, such as from about 1 inch to about 4 inches.

In general, any suitable process or technique can be used in order to break up or crumble the densified plant material residue into discrete pieces. For example, in one embodiment, a roller mill may be used in order to break up the densified plant material residue. In an alternative embodiment, a hammer mill may be used in order to reduce the densified plant material residue into discrete pieces.

In one embodiment, the densified plant material residue or briquettes can be fed into a nip formed between two rotating rollers. The rollers, for instance, can be spaced a certain distance apart through which the densified plant material residue is fed. The gap or nip distance between the two rollers, for instance, can be greater than about 0.5 inches, such as greater than about 0.75 inches, such as greater than about 1 inch, such as greater than about 1.25 inches, and generally less than about 3 inches, such as less than about 2 inches, such as less than about 1.75 inches, such as less than about 1.5 inches. As the briquettes are fed through the nip formed between the rotating rollers, the briquettes are broken up into pieces having the desired size. The gap distance, the rotational speeds of the rollers, and various other parameters can be changed and modified in order to ensure that the resulting composition has the desired size and size distribution.

In one embodiment, the resulting composition produced from the above process generates particles that can have an average largest dimension of from about 0.5 inches to about 2 inches. In one embodiment, the plant material residue can be densified and then broken up into pieces so that the resulting composition has a bulk density with improved absorbency and adsorbency properties. The bulk density of the resulting composition, for instance, can generally be greater than about 0.2 g/cm$^3$, such as greater than about 0.25 g/cm$^3$, such as greater than about 0.275 g/cm$^3$. The bulk density is generally less than about 0.5 g/cm$^3$, such as less than about 0.4 g/cm$^3$, such as less than about 0.35 g/cm$^3$, such as less than about 0.3 g/cm$^3$. In one embodiment, for instance, the bulk density of the resulting composition can be from about 0.26 g/cm$^3$ to about 0.29 g/cm$^3$. Bulk density can be measured according to EN 15103:2009.

The composition of the present disclosure can be made entirely from plant material residue. No binders or other substances are needed in order to create a product that has excellent absorbency and adsorbency properties, especially for oily substances. Thus, the composition can contain the plant material residue in an amount greater than about 70% by weight, such as in an amount greater than about 80% by weight, such as in an amount greater than about 90% by weight, such as in an amount greater than about 95% by weight, such as in an amount greater than about 98% by weight. In one embodiment, the composition is made entirely from plant material residue.

If desired, however, various other additives and ingredients can be incorporated into the composition. For instance, in one embodiment, further absorbent materials may be incorporated into the composition.

The composition of the present disclosure has numerous uses and applications. In one embodiment, for instance, the composition can be used as a remediation composition for absorbing or adsorbing all different types of chemical spills. For instance, the composition can be used to clean up all different types of hydrocarbons, ammonia, and various other chemical substances. In one embodiment, the composition is used in order to absorb and/or adsorb oily substances. The oily substance, for instance, can be a vegetable oil, an animal oil, or a petroleum-based oil. For instance, the oily substance may comprise petroleum or a substance derived from petroleum. The oily substance may comprise any hydrocarbon liquid. In order to remediate oily substances, the composition only needs to contact the substance for absorption and/or adsorption to occur.

As described above, the composition of the present disclosure is particularly well suited for the remediation of oily substances. For example, when tested according to ASTM Test F726-17, the composition of the present disclosure can display a D5 mean oil adsorbency based on volume (cm$^3$/cm$^3$) of greater than about 0.7, such as greater than about 0.75, such as greater than about 0.8, such as greater than about 0.85 and generally less than about 1. The composition can display an N100 oil adsorbency of greater than about 0.85, such as greater than about 0.9, such as greater than about 0.95, such as greater than about 1, and generally less than about 1.2 (cm$^3$/cm$^3$). The composition of the present disclosure can also display a N750 oil adsorbency of greater than about 0.85, such as greater than about 0.9, such as greater than about 0.95, such as greater than about 1, such as greater than about 1.1, and generally less than about 1.4 (cm$^3$/cm$^3$). The composition of the present disclosure can also display a D7500 oil adsorbency based on volume of greater than about 0.9, such as greater than about 0.92, such as greater than about 0.94, and generally less than about 1.2.

The above oil adsorbency properties are dramatic and unexpected in view of the raw material used to produce the composition. For instance, the oil adsorbency properties of the plant material residue can be increased on a volumetric basis of greater than about 30%, such as greater than about 50%, such as greater than about 70%, such as greater than about 100%, such as greater than about 120%, such as even greater than about 150%.

In addition to the above oil adsorbency properties, the plant material residue of the present disclosure has also been found to unexpectedly be resistant to ignition. By being resistant to ignition, the material is safe to store prior to use. The fire resistant properties of the material are particularly advantageous when stored around flammable liquids, gases and other materials. In addition, the material produces little to no nuisance dust. Thus, the material is safe to store and use without creating a fire hazard or a health hazard.

In one embodiment, the plant material residue of the present disclosure can be stored at an industrial site, such as on an oil platform. The material can be used to pick up oil spills or other chemical spills without creating any nuisance dust. Once used to soak up or remediate an oil or chemical spill, the used material can then be ignited and disposed. For instance, the material can be incinerated and, if desired, the energy produced from the incineration can be used to produce power or otherwise to provide heat. In this manner, the plant material residue of the present disclosure is completely sustainable and does not contribute to disposables in landfills.

The present disclosure may be better understood with reference to the following example.

EXAMPLE

The following example was conducted to demonstrate the oil adsorbency properties of compositions made in accordance with the present disclosure.

Sample No. 1 below was made in accordance with the present disclosure. In order to produce the sample, flax shives were first densified into a 75 mm diameter briquette with a density of 0.883 g/cm$^3$. The shives were densified using a briquetting press having Model No. BP6500 from the C.F. Nielsen A/S Company. After forming the briquette, the briquette was fed to a crumbling device that included two spaced apart rollers. The briquette was fed into a nip created by the rollers. The nip gap had a distance of approximately one inch. The crumbling device generated particles that varied in size from about 0.5 inches to about 2 inches.

The composition made in accordance with the present disclosure was compared with nine other samples as follows:

Sample No. 2: STARDUST absorbent marketed by Stardust Spill
Products, LLC
Sample No. 3: flax shives
Sample No. 4: PIG DRI absorbent marketed by the New Pig Corporation
Sample No. 5: ENVIRO-DRI absorbent marketed by Can-Ross Environmental Services Ltd.
Sample No. 6: corn cob absorbent material
Sample No. 7: OIL GATOR absorbent marketed by Gator International
Sample No. 8: flax fiber
Sample No. 9: flax flour
Sample No. 10: wood mulch Each of the samples had the following bulk density:

TABLE 1

| Sample No. | Bulk Density (g/cm$^3$) |
| --- | --- |
| 1 | 0.2816 |
| 2 | 0.1831 |
| 3 | 0.1094 |
| 4 | 0.6331 |
| 5 | 0.3935 |
| 6 | 0.3333 |
| 7 | 0.5324 |
| 8 | 0.0823 |
| 9 | 0.1692 |
| 10 | 0.1730 |

Bulk density was measured according to EN 15103:2009 "Solid Biofuels-Determination of Bulk Density".

The oil adsorption properties of each sample was then tested. Oil adsorbency was measured according to ASTM Test F726-17.

The adsorbent test samples were conditioned in the laboratory for a minimum of 24 hours at a temperature of 22±2° C. and relative humidity of 55±5%.

The analysis was conducted using general purpose viscosity reference standards sourced from Paragon Scientific Ltd. These standards are oil based, consisting of white oils and polybutene.

TABLE 2

| General Purpose Viscosity Reference Standards | | |
| --- | --- | --- |
| Standard Name | Viscosity range 20° to 25° | Density g/cm$^3$ |
| D5 | 5.497 to 4.739 cP | 0.8451 |
| N100 | 289.6 to 207.5 cP | 0.8749 |
| N750 | 2365 to 1649 cP | 0.8866 |
| D7500 | 11107 to 7324 cP | 0.9125 |

Samples 1, 3-6, 8 and 10 were analysed using 210 Micron/70 Mesh baskets. 37 Micron/400 Mesh baskets were used for Samples 2, 7 and 9.

A minimum weight of 4 g was used for each adsorbent replica. The adsorbent was weighted into labelled mesh baskets and then lowered into a test cell prefilled with the required oil (minimum liquid layer of 2.5 cm). After 15 minutes±20 seconds, the basket with the adsorbent was removed and allowed to drain on a wire rack 30±3 s (a 2 minute±3 s drain time was used for the higher viscosity D7500 oil). The adsorbent was then transferred to a tared weighting pan, with the sample weight subsequently determined and recorded. All tests were conducted in triplicate.
Volumetric Ratio of Oil Adsorbed to Volume of Dry Adsorbent Oil Adsorbency$_v$=S$_{SV}$/S$_{OV}$ Where:
S$_{SV}$=net oil adsorbed (S$_s$)/oil density.
S$_{OV}$=initial dry adsorbent weight (S$_o$)/sorbent storage density.
Cubage factor=the inverse volumetric ratio of oil adsorbed to volume of dry adsorbent.

Figure 2:
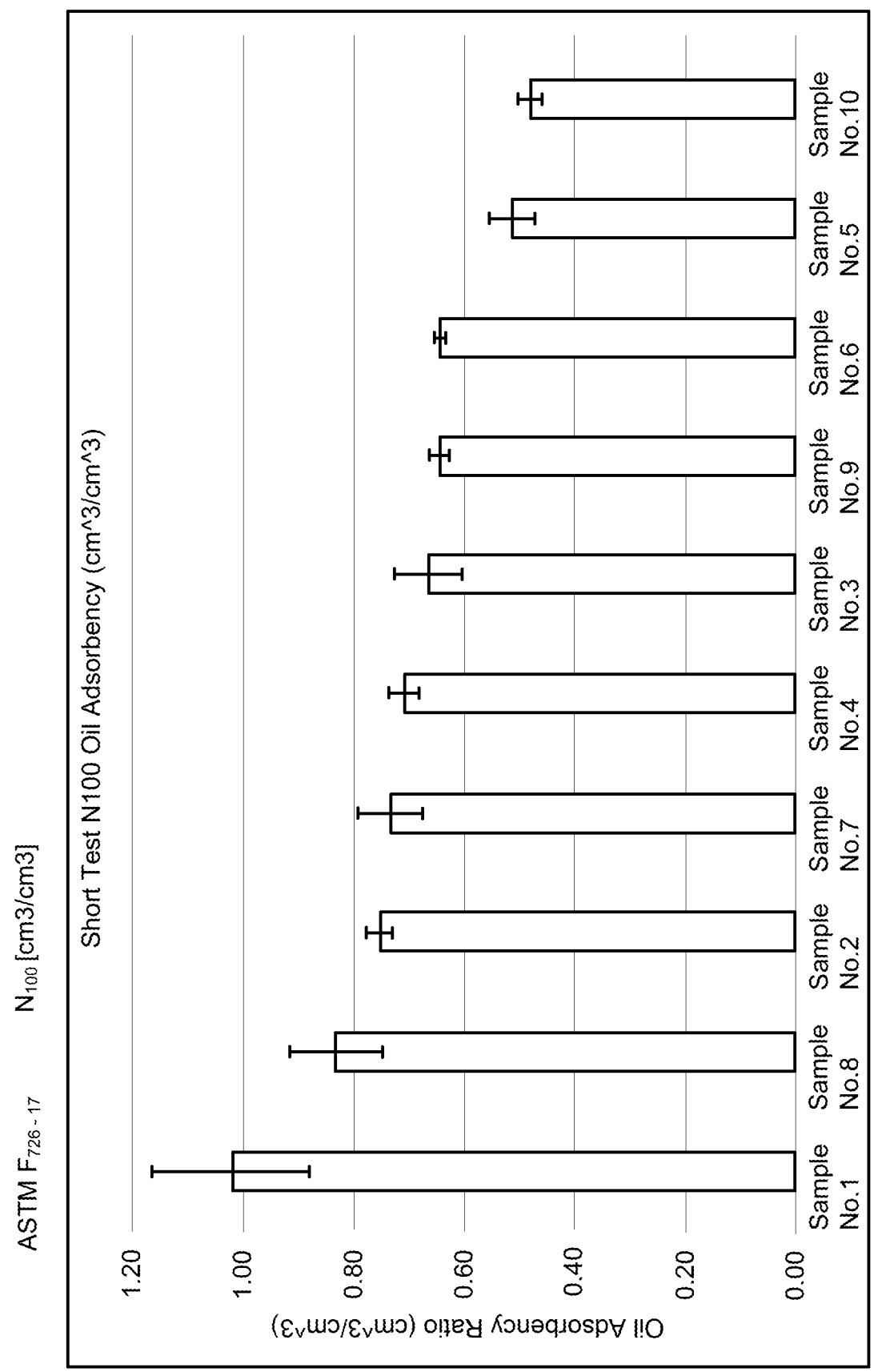
Figure 3:
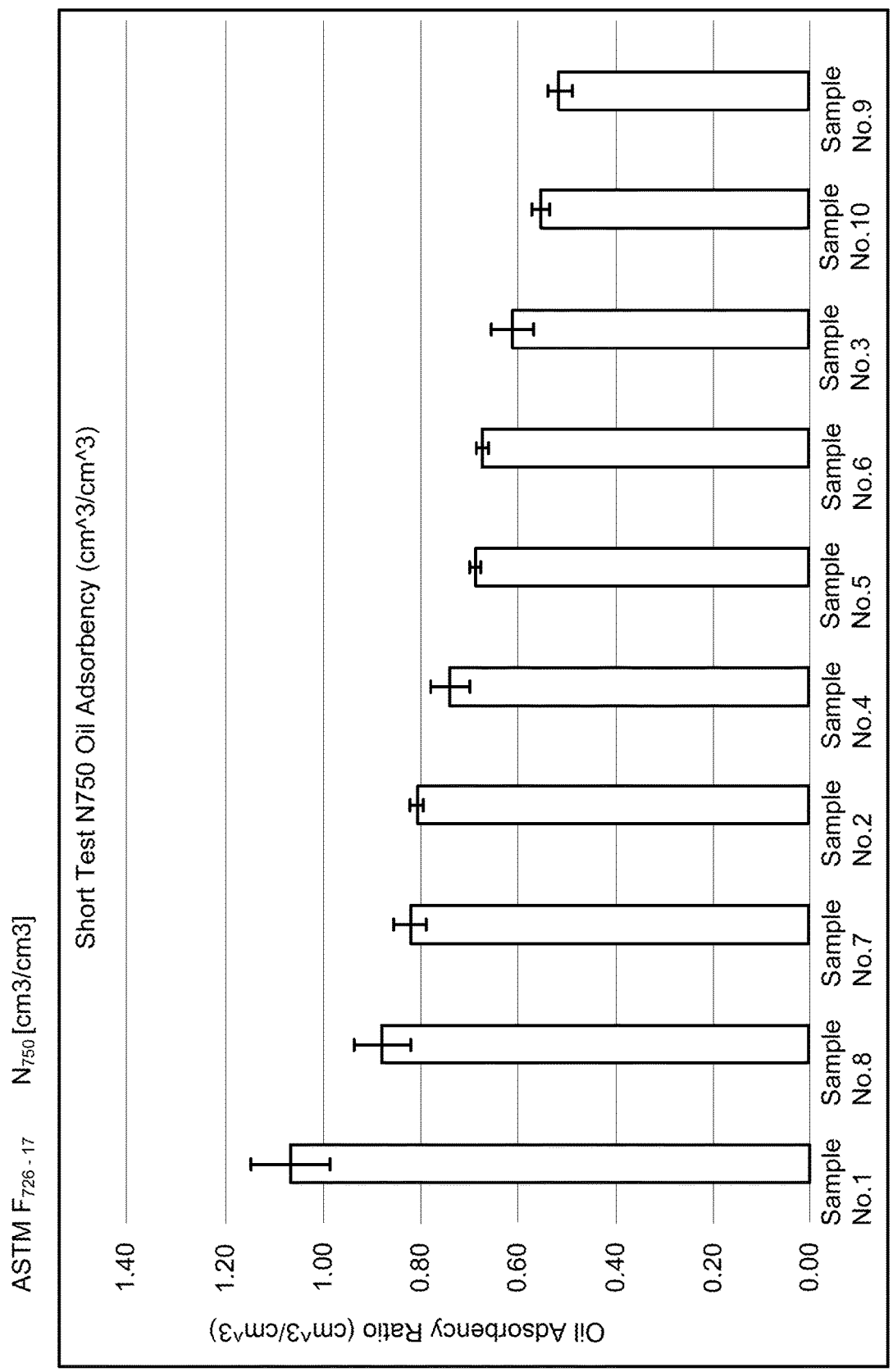
Figure 4:
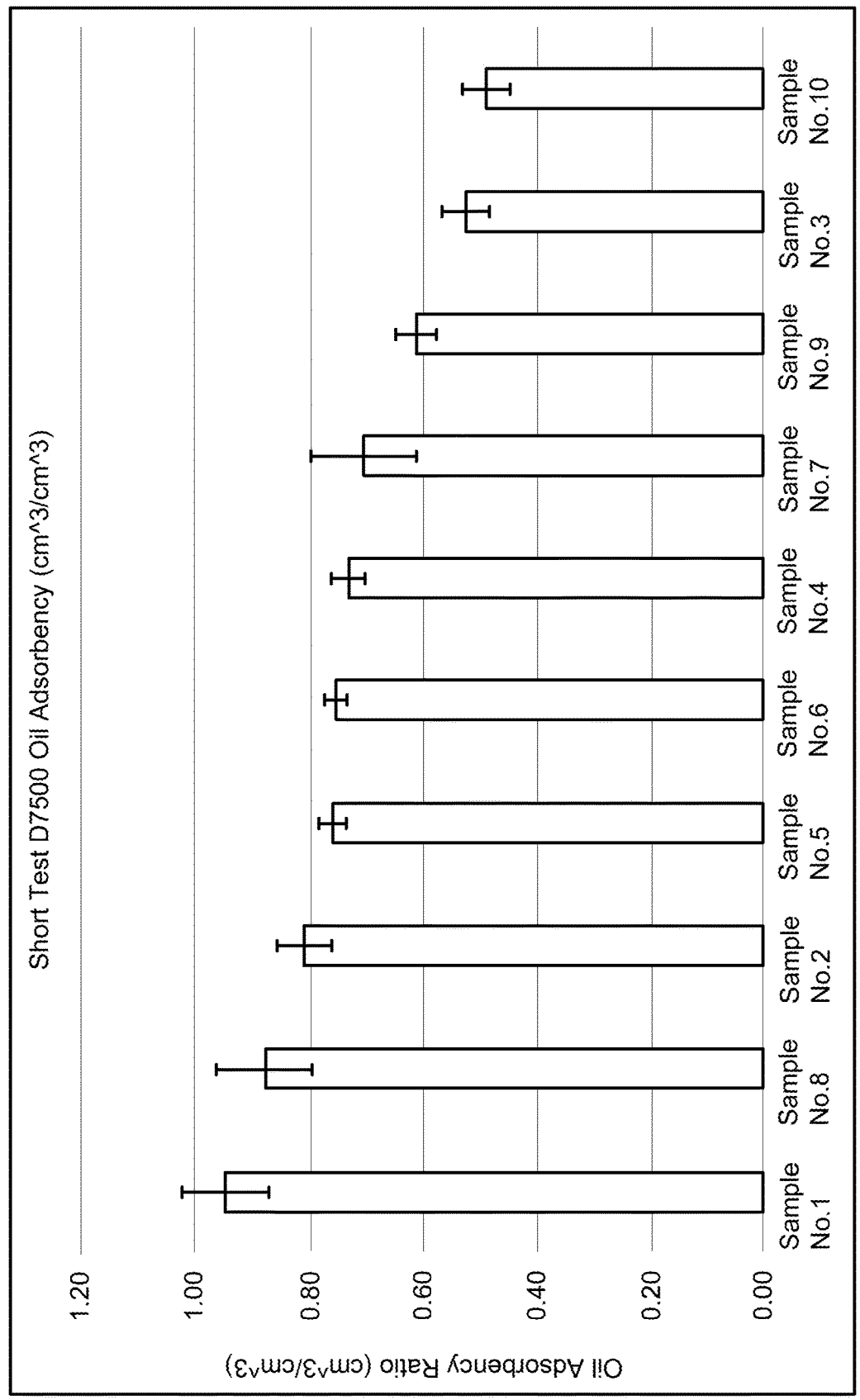

The results are presented below and are illustrated in FIGS. 1-4 for the different oils tested.

| Standard Name | Mean Volumetric Ratio of Oil Adsorbed to Volume of Dry Adsorbent (cm³/cm³) | Cubage factor |
|---|---|---|
| Sample No. 1 | | |
| D5 | 0.8546 | 1.1733 |
| N100 | 1.0212 | 0.9921 |
| N750 | 1.0653 | 0.9421 |
| D7500 | 0.9487 | 1.0585 |
| Sample No. 2 | | |
| D5 | 0.6628 | 1.5089 |
| N100 | 0.7542 | 1.3267 |
| N750 | 0.8088 | 1.2367 |
| D7500 | 0.8103 | 1.2369 |
| Sample No. 3 | | |
| D5 | 0.6529 | 1.5511 |
| N100 | 0.5237 | 1.9176 |
| N750 | 0.6109 | 1.6425 |
| D7500 | 0.5237 | 1.9176 |
| Sample No. 4 | | |
| D5 | 0.6444 | 1.5543 |
| N100 | 0.7094 | 1.4110 |
| N750 | 0.7392 | 1.3556 |
| D7500 | 0.7316 | 1.3683 |
| Sample No. 5 | | |
| D5 | 0.6442 | 1.5527 |
| N100 | 0.5130 | 1.9567 |
| N750 | 0.6873 | 1.4553 |
| D7500 | 0.7605 | 1.3158 |
| Sample No. 6 | | |
| D5 | 0.5846 | 1.7144 |
| N100 | 0.6425 | 1.5568 |
| N750 | 0.6721 | 1.4882 |
| D7500 | 0.7548 | 1.3254 |
| Sample No. 7 | | |
| D5 | 0.5376 | 1.8610 |
| N100 | 0.7330 | 1.3701 |
| N750 | 0.8222 | 1.2176 |
| D7500 | 0.7036 | 1.4382 |
| Sample No. 8 | | |
| D5 | 0.4913 | 2.0406 |
| N100 | 0.8323 | 1.2095 |
| N750 | 0.8793 | 1.1405 |
| D7500 | 0.8802 | 1.1426 |
| Sample No. 9 | | |
| D5 | 0.4077 | 2.4534 |
| N100 | 0.6445 | 1.5524 |
| N750 | 0.5137 | 1.9499 |
| D7500 | 0.6114 | 1.6393 |
| Sample No. 10 | | |
| D5 | 0.3553 | 2.8404 |
| N100 | 0.4811 | 2.0810 |
| N750 | 0.5526 | 1.8108 |
| D7500 | 0.4877 | 2.0599 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for remediating oil spills comprising:
contacting an oily substance with an oil adsorbent composition, the oil adsorbent composition comprising pieces of densified plant material residue, the plant material residue including non-fibrous plant matter, the pieces of densified plant material having a bulk density of from about 0.2 g/cm³ to about 0.5 g/cm³;
wherein the densified plant material residue comprises flax shives, corn stovers, hemp herd, bagasse, wheat straw, barley straw, switch grass, or mixtures thereof.

2. A process as defined in claim 1, wherein the densified plant material residue has a density of greater than about 0.6 g/cm³.

3. A process as defined in claim 2, wherein the densified plant material residue has a density of less than about 1 g/cm³.

4. A process as defined in claim 1, wherein the pieces of densified plant material residue have a size such that greater than 50% of the pieces have a largest dimension of from about 0.5 inches to about 5 inches.

5. A process as defined in claim 1, wherein the oily substance comprises petroleum or a substance derived from petroleum.

6. A process as defined in claim 1, wherein the oily substance comprises a liquid hydrocarbon.

7. A process as defined in claim 1, wherein the oil adsorbent composition has a D5 mean oil absorbency based on volume (cm³/cm³) of greater than about 0.7 when tested according to ASTM Test F726-17.

8. A process as defined in claim 1, wherein the pieces of densified plant material residue have a bulk density of from about 0.25 g/cm³ to about 0.4 g/cm³.

9. A process as defined in claim 1, wherein the densified plant material residue comprises greater than about 70% by weight of the oil adsorbent composition.

10. A process as defined in claim 1, wherein after contacting the oily substance with the oil adsorbent composition, the resulting material is incinerated.

* * * * *